United States Patent
Chen et al.

(10) Patent No.: US 11,093,080 B2
(45) Date of Patent: Aug. 17, 2021

(54) ELECTRONIC DEVICE AND FINGERPRINT SENSING CONTROL METHOD THEREOF

(71) Applicant: Novatek Microelectronics Corp., Hsinchu (TW)

(72) Inventors: Shih-Cheng Chen, Taichung (TW); Cho-Hsuan Jhang, Hsinchu (TW); Chih-Peng Hsia, Hsinchu County (TW); Shiang-Fei Wang, Tainan (TW); Su-Wei Lien, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/726,250

(22) Filed: Dec. 24, 2019

(65) Prior Publication Data

US 2020/0210065 A1     Jul. 2, 2020

Related U.S. Application Data

(60) Provisional application No. 62/844,736, filed on May 7, 2019, provisional application No. 62/785,239, filed on Dec. 27, 2018.

(51) Int. Cl.
*G06F 3/041*     (2006.01)
*G06K 9/00*     (2006.01)
(Continued)

(52) U.S. Cl.
CPC ........ *G06F 3/041661* (2019.05); *G06F 3/042* (2013.01); *G06K 9/0004* (2013.01); *G06K 9/00026* (2013.01); *G06K 9/2081* (2013.01)

(58) Field of Classification Search
CPC .. G06F 3/0488; G06F 3/04886; G06F 3/0412; G06F 21/32; G06F 21/31;
(Continued)

(56) References Cited

U.S. PATENT DOCUMENTS

| 8,917,387 B1 | 12/2014 | Lee et al. |
| 2005/0031175 A1* | 2/2005 | Hara ................. G06K 9/0002 382/124 |

(Continued)

FOREIGN PATENT DOCUMENTS

| CN | 103970337 | 8/2014 |
| CN | 106951884 | 7/2017 |

(Continued)

OTHER PUBLICATIONS

"Office Action of Taiwan Counterpart Application", dated Jan. 5, 2021, pp. 1-34.

*Primary Examiner* — Dong Hui Liang
(74) *Attorney, Agent, or Firm* — JCIPRNET

(57) ABSTRACT

An electronic device and a fingerprint sensing control method thereof are provided. A sensing region of a display panel is divided into a plurality of fingerprint zones. The electronic device determines at least one target fingerprint zone from the fingerprint zones according to a touched area. The electronic device scans the at least one target fingerprint zone for performing fingerprint sensing. The electronic device performs an accelerated reading operation. The accelerated reading operation includes: reading at least one sensing signal from the at least one target fingerprint zone; and skipping reading at least one of the fingerprint zones other than the at least one target fingerprint zone among the fingerprint zones.

50 Claims, 5 Drawing Sheets

(51) Int. Cl.
G06F 3/042 (2006.01)
G06K 9/20 (2006.01)

(58) Field of Classification Search
CPC ........ G06F 21/3262; G06F 2203/0338; G06K
9/0002; G06K 9/00013; G06K 9/00087;
G06K 9/0004; G06K 9/00006; G06K
9/00067; G06K 9/0008; G06K 9/001;
G06K 9/00026; G06K 9/036; H04M
2250/22; G09G 3/3677; G09G 3/3648;
G09G 3/3266; G09G 2310/0286
See application file for complete search history.

(56) References Cited

U.S. PATENT DOCUMENTS

2014/0355846 A1   12/2014   Lee et al.

| | | | |
|---|---|---|---|
| 2016/0195990 A1* | 7/2016 | Han | G06F 3/041661 |
| | | | 345/173 |
| 2016/0349882 A1* | 12/2016 | Liu | G06F 3/042 |
| 2017/0004798 A1* | 1/2017 | Park | G09G 3/3648 |
| 2017/0115811 A1* | 4/2017 | Yang | G06F 3/044 |
| 2017/0351364 A1 | 12/2017 | Kim et al. | |
| 2018/0224999 A1 | 8/2018 | Lee et al. | |
| 2020/0097700 A1* | 3/2020 | Lin | G06K 9/00013 |

FOREIGN PATENT DOCUMENTS

| | | |
|---|---|---|
| CN | 107402661 | 11/2017 |
| CN | 107423601 | 12/2017 |
| CN | 107895143 | 4/2018 |
| CN | 108399882 | 8/2018 |
| CN | 109241940 | 1/2019 |
| CN | 110309803 | 10/2019 |
| TW | 201546722 | 12/2015 |

* cited by examiner

ELECTRONIC DEVICE AND FINGERPRINT SENSING CONTROL METHOD THEREOF

CROSS-REFERENCE TO RELATED APPLICATION

This application claims the priority benefit of U.S. provisional application Ser. No. 62/785,239, filed on Dec. 27, 2018. This application also claims the priority benefit of U.S. provisional application Ser. No. 62/844,736, filed on May 7, 2019. The entirety of the above-mentioned patent applications is hereby incorporated by reference herein and made a part of this specification.

BACKGROUND

Field of the Invention

The invention relates to an electronic device and more particularly, to a fingerprint sensing control method.

Description of Related Art

A fingerprint sensor may be placed under a glass substrate. Alternatively, the fingerprint sensor may be placed under a display panel. Or, alternatively, the fingerprint sensor may be embedded in the display panel. Thus, a part (or all) of a display region of the display panel may be served as a sensing region for sensing a fingerprint. Generally, as an area of the sensing region is increased, a degree of freedom in an operation of a user may be increased. The sensing region (the fingerprint sensor) has a plurality of sensing units (sensing pixels). When the user presses a finger on any location of the sensing region of the display panel, the fingerprint sensor may sense/recognize a fingerprint of the user's finger.

Generally, a system reads sensing results of all the sensing units of the fingerprint sensor (the sensing region) through a fingerprint sensing control circuit, so as to perform fingerprint sensing. In practice, the system performs the reading operation on all the sensing units of the sensing region one by one (or one row by one row) in a predetermined scanning sequence. As a size of the panel (the area of the sensing region) is increased, it needs a longer time for the fingerprint sensing control circuit to perform the reading operation on the sensing region.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides an electronic device and a fingerprint sensing control method thereof to accelerate a fingerprint reading operation of a sensing region of a display panel.

According to an embodiment of the invention, a fingerprint sensing control method capable of performing a fingerprint sensing control on a display panel is provided. The display panel includes a sensing region divided into a plurality of fingerprint zones. The fingerprint sensing control method includes: determining at least one target fingerprint zone from the fingerprint zones according to at least one touched area; scanning the at least one target fingerprint zone to control the at least one target fingerprint zone to perform fingerprint sensing; and performing an accelerated reading operation. The accelerated reading operation includes: reading at least one sensing signal from the at least one target fingerprint zone; and skipping reading at least one of the fingerprint zones other than the at least one target fingerprint zone among the fingerprint zones. The skipping reading includes: not reading any sensing signal from the at least one fingerprint zone that is skipped.

According to an embodiment of the invention, an electronic device capable of controlling a fingerprint sensing control on a display panel is provided. The display panel includes a sensing region divided into a plurality of fingerprint zones. The electronic device includes a touch control circuit and a fingerprint sensing control circuit. The touch control circuit is coupled to the display panel. The touch control circuit is configured to perform touch detection on the display panel to obtain at least one touched area of at least one finger. The fingerprint sensing control circuit is coupled to the touch control circuit to obtain information of the at least one touched area. The fingerprint sensing control circuit is coupled to the display panel to perform a fingerprint sensing control on the display panel. The fingerprint sensing control circuit is configured to determine at least one target fingerprint zone from the fingerprint zones according to the at least one touched area. The fingerprint sensing control circuit scans the at least one target fingerprint zone to control the at least one target fingerprint zone to perform fingerprint sensing. The fingerprint sensing control circuit performs an accelerated reading operation. The accelerated reading operation includes: reading at least one sensing signal from the at least one target fingerprint zone; and skipping reading at least one of the fingerprint zones other than the at least one target fingerprint zone among the fingerprint zones, so as not to read any sensing signal from the at least one fingerprint zone that is skipped.

According to an embodiment of the invention, a fingerprint sensing control method capable of performing a fingerprint sensing control on a display panel is provided. The display panel includes a sensing region divided into a plurality of fingerprint zones. The fingerprint sensing control method includes: determining at least one target fingerprint zone from the fingerprint zones according to at least one touched area; and performing an accelerated scanning operation. The accelerated reading operation includes: scanning the at least one target fingerprint zone to control the at least one target fingerprint zone to perform fingerprint sensing; accelerating scanning (or skipping) at least one fingerprint zone other than the at least one target fingerprint zone among the fingerprint zones; and reading at least one sensing signal from the at least one target fingerprint zone.

According to an embodiment of the invention, an electronic device including a touch control circuit and a fingerprint sensing control circuit is provided. The touch control circuit is configured to be coupled to a display panel, and configured to perform touch detection on the display panel to obtain at least one touched area. The fingerprint sensing control circuit is coupled to the touch control circuit to obtain the at least one touched area. The fingerprint sensing control circuit is configured to be coupled to the display panel to perform a fingerprint sensing control on the display panel. The display panel is divided into a plurality of fingerprint zones. The fingerprint sensing control circuit determines at least one target fingerprint zone from the fingerprint zones according to the at least one touched area. The fingerprint sensing control circuit scans the at least one target fingerprint zone to control the at least one target fingerprint zone to perform fingerprint sensing. The fingerprint sensing control circuit reads at least one sensing signal from the at least one target fingerprint zone. The fingerprint sensing control circuit skips reading at least one of the fingerprint zones other than the at least one target fingerprint zone among the fingerprint zones, so as not to read any sensing signal from the fingerprint zones other than the at least one target fingerprint zone.

According to an embodiment of the invention, a fingerprint sensing control method for performing a fingerprint sensing control on a display panel is provided. The display panel comprises a sensing region divided into a plurality of fingerprint zones. The fingerprint sensing control method comprises: providing a clock to at least one shift register for performing scanning operation on the fingerprint zones; scanning a touched area with the clock having a first clock frequency; and scanning at least one first non-touched area with the clock having a second clock frequency higher than the first clock frequency or skipping scanning the at least one first non-touched area.

To sum up, in the embodiments of the invention, the sensing region of the display panel is divided into a plurality of fingerprint zones. When an object (e.g., a fingerprint) touches the display panel, the touch detection can be performed on the display panel to obtain the touched areas. The fingerprint sensing control circuit can determine one or more target fingerprint zones from the fingerprint zones according to the touched areas. The fingerprint sensing control circuit can scan the target fingerprint zones and read the sensing signals from the one or more target fingerprint zones, so as to perform the fingerprint sensing. For the fingerprint zones other than the one or more target fingerprint zones among the fingerprint zones, the fingerprint sensing control circuit can skip reading the other fingerprint zones, so as to accelerate the fingerprint reading operation of the sensing region of the display panel.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
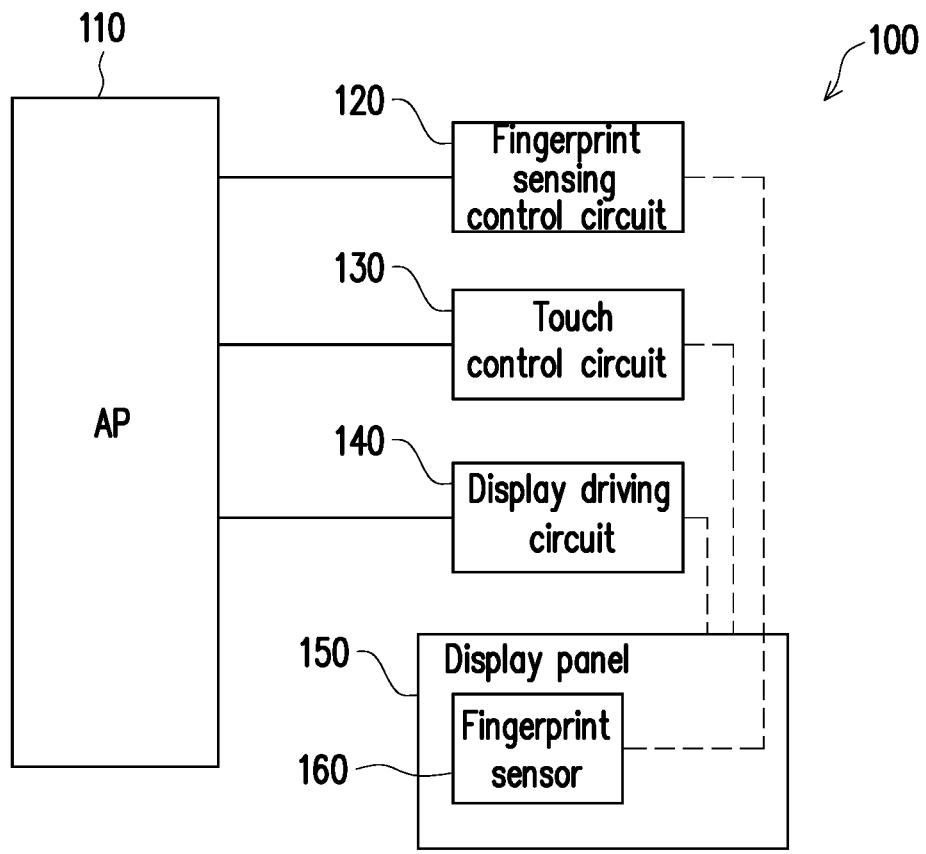
FIG. 1 is a schematic circuit block diagram illustrating an electronic device according to an embodiment of the invention.

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

FIG. 1 is a schematic circuit block diagram illustrating an electronic device 100 according to an embodiment of the invention. The electronic device 100 illustrated in FIG. 1 includes a fingerprint sensing control circuit 120, a touch control circuit 130, and a display driving circuit 140. It is noted that although the fingerprint sensing control circuit 120, the touch control circuit 130, and the display driving circuit 140 are shown as different circuit blocks, a part or whole of each block can be integrated with a part or whole of the other one or two blocks. In some embodiments, part or all of the fingerprint sensing control circuit 120, the touch control circuit 130, and the display driving circuit 140 can be integrated in a single chip or separated to be different chips. The chip can be used to communicate with an application processor (AP) 110 and control a display panel 150. In some embodiments, the electronic device 100 can further include the display panel 150 to serve as a display panel module. In some embodiment, the electronic device 100 can further include the application processor (AP) 110. The electronic device 100 may be a mobile device or other non-mobile computing device.

The AP 110 can be coupled to the display driving circuit 140 to provide an image frame. The display driving circuit 140 can be coupled (directly or indirectly connected) to the display panel 150. The display driving circuit 140 may drive the display panel 150 to display an image in a display region of the display panel 150. For example, the display panel 150 can include a display gate on array (GOA) circuit (not shown) and the display driving circuit 140 can communicate with the GOA circuit to control the display panel 150.

The display panel 150 can include a touch detector (not shown). For example, the display panel 150 can be a touch display panel. The touch control circuit 130 is coupled to control the touch detector of the display panel 150. The touch control circuit 130 performs touch detection on the display panel 150 to obtain a touched area corresponding to an object (e.g., a finger) on the display panel 150. In the same or alternative embodiments, the touch control circuit 130 may obtain the touched area of the object on the display panel 150. The AP 110 is coupled to the touch control circuit 130 to receive a touch detection result. In some embodiments, the AP 110 may obtain the touched area of the object on the display panel 150.

The display panel 150 further includes a fingerprint sensor 160. Based on a design requirement, the fingerprint sensor 160 may be an optical fingerprint sensor or other fingerprint sensors such as a capacitive fingerprint sensor. The fingerprint sensor 160 may be placed under the display panel 150. Alternatively, the fingerprint sensor 160 may be embedded in the display panel 150. Implementation details of the display panel 150 may be determined based on a design requirement. For example, the fingerprint sensor 160 may be arranged in one of an on-display configuration, an under-display configuration, a local in-display configuration and a global in-display configuration. Alternatively, the fingerprint sensor 160 may be arranged in the other configurations. Thus, a part (or all) of a display region of the display panel 150 may be served as the sensing region of the fingerprint sensor 160 for sensing a fingerprint. Generally, as an area of the sensing region is increased, a degree of freedom in an operation of a user may be increased. The sensing region (the fingerprint sensor 160) may have a plurality of sensing units (sensing pixels). The sensing units can be arranged as on a same layer or different layers as a plurality of display pixels. In implements having the-same-layer structure, the sensing units and the display pixels can be arranged to be interlaced with the display pixels, for example, one or more columns of display pixels are arranged along with one or more columns of sensing units. Alternatively, the sensing units and the display pixels can be arranged to be located in different regions so as not to be interleaved with each other. When the user presses a finger on any location of the sensing region of the display panel 150, the fingerprint sensor 160 may sense/recognize a fingerprint of the user's finger. In some embodiments, the AP 110 is coupled to the fingerprint sensing control circuit 120.

The fingerprint sensing control circuit 120 can be coupled (directly or indirectly connected) to control the fingerprint sensor 160 of the display panel 150 to perform a fingerprint sensing control on the display panel 150 and read a sensing signal. For example, the display panel 150 can include a fingerprint gate on array (GOA) circuit (not shown) and the fingerprint sensing control circuit 120 can communicate with the GOA circuit to control the fingerprint sensor 160 of the display panel 150. The AP 110 can be further coupled to the fingerprint sensing control circuit 120 to receive a sensing result (i.e., a sensing signal). In some embodiments, the fingerprint sensing control circuit 120 is further coupled to the touch control circuit 130 to obtain information of the touched area. In some other embodiments, the fingerprint sensing control circuit 120 is not coupled to the touch control circuit 130, but the AP 110 may provide the information of the touched area of the touch control circuit 130 to the fingerprint sensing control circuit 120.

Based on a design requirement, in some embodiments, the fingerprint sensing control circuit 120, the touch control circuit 130 and the display driving circuit 140 may be different integrated circuits. In some other embodiments, the touch control circuit 130 and the display driving circuit 140 may be integrated in a touch with display driver integration (TDDI) chip or in an TDDI integrated circuit, and the fingerprint sensing control circuit 120 may be implemented in another chip or integrated circuit. For example, the display panel 150 can include a TDDI gate on array (GOA) circuit (noy shown) and the TDDI chip or integrated circuit can communicate with the TDDI GOA circuit to control the touch and display operation on the display panel 150. In yet other embodiments, the fingerprint sensing control circuit 120, the touch control circuit 130 and the display driving circuit 140 may be integrated in a single integrated circuit.

Figure 2:
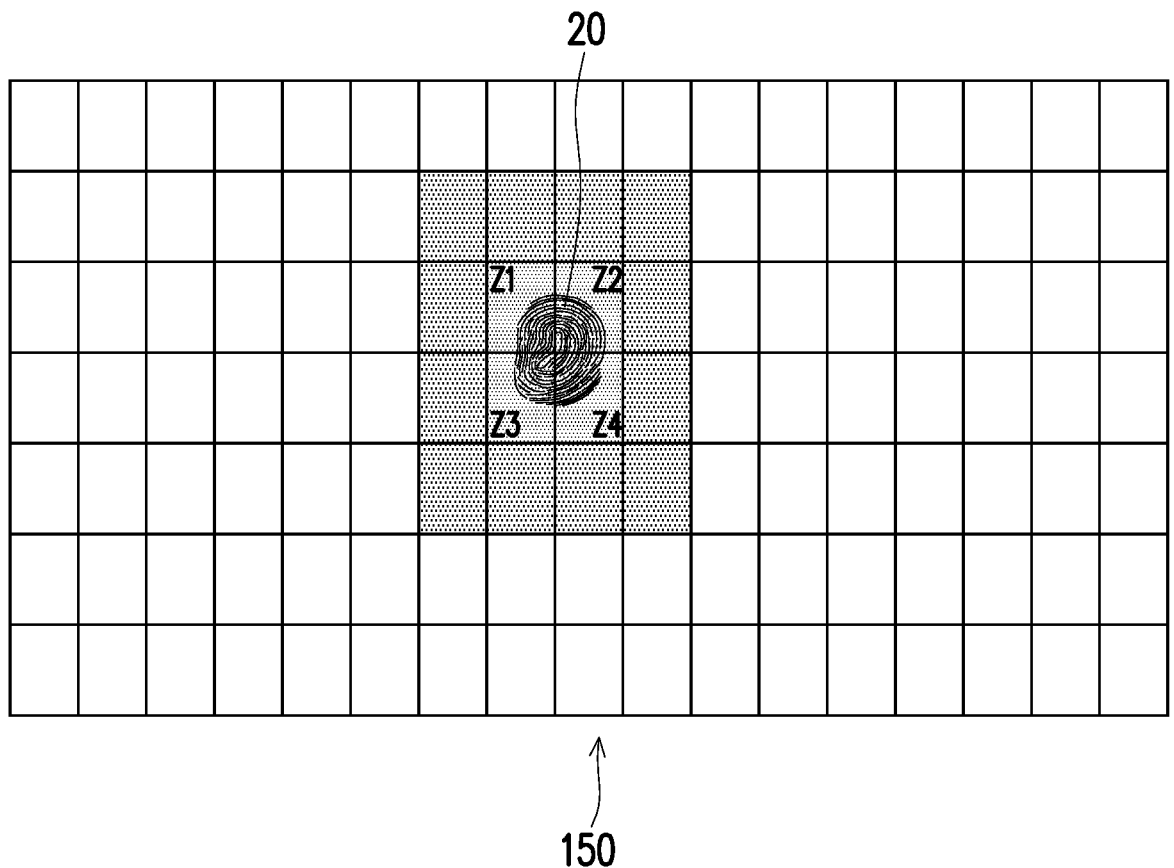
FIG. 2 is a schematic diagram illustrating an operation scenario of the display panel according to an embodiment of the invention.

FIG. 2 is a schematic diagram illustrating an operation scenario of the display panel 150 according to an embodiment of the invention. Referring to FIG. 1 and FIG. 2, in the example illustrated in FIG. 2, the sensing region of the display panel 150 is divided into a plurality of fingerprint zones (i.e., a plurality of small blocks illustrated in FIG. 2, such as fingerprint zones Z1, Z2, Z3 and Z4 illustrated in FIG. 2). The touch control circuit 130 performs touch detection on the display panel 150 to obtain the touched area corresponding to the finger on the display panel 150.

Figure 3:
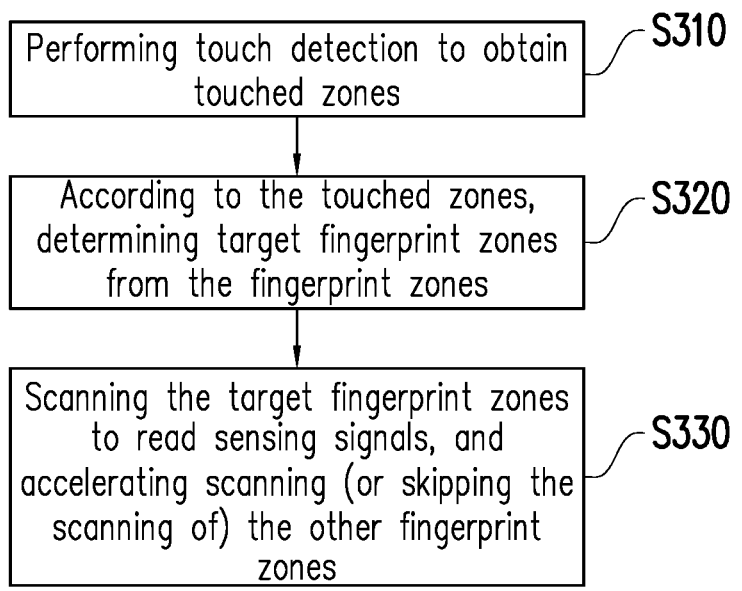
FIG. 3 is a flowchart illustrating a fingerprint sensing control method according to an embodiment of the invention.

FIG. 3 is a flowchart illustrating a fingerprint sensing control method according to an embodiment of the invention. Referring to FIG. 1, FIG. 2 and FIG. 3, in step S310, the touch control circuit 130 may perform touch detection on the display panel 150 to obtain a touched area 20 corresponding to an object (e.g., one or more fingers) on the display panel 150. In step S320, the fingerprint sensing control circuit 120 determines at least one target fingerprint zone from the fingerprint zones of the display panel 150 according to the at least one touched area 20. For example, the fingerprint sensing control circuit 120 may determine a location of the at least one target fingerprint zone according to a location of the at least one touched area. The at least one touched area may be located in the at least one target fingerprint zone. Moreover, the fingerprint sensing control circuit 120 may determine a total number of the at least one target fingerprint zone according to an area of the at least one touched area 20. In the example illustrated in FIG. 2, because the touched area 20 overlaps and covers the fingerprint zones Z1, Z2, Z3 and Z4, the fingerprint sensing control circuit 120 may determine the fingerprint zones Z1, Z2, Z3 and Z4 as the target fingerprint zones.

In step S330, the fingerprint sensing control circuit 120 may perform an "accelerated scanning operation". The fingerprint sensing control circuit 120 may include a control circuit for scanning operation and a reading circuit for reading operation. The accelerated scanning operation, performed by the control circuit, can include: scanning the target fingerprint zones (e.g., the fingerprint zones Z1, Z2, Z3 and Z4 illustrated in FIG. 2) to control the target fingerprint zones to perform fingerprint sensing; and accelerating scanning the fingerprint zones other than the target fingerprint zones Z1, Z2, Z3 and Z4 among the fingerprint zones in some embodiments.

It is noted that the accelerated scanning operation can be performed in units of fingerprint zones. However, that the accelerated scanning operation can be also performed in units of smaller areas, for example, according to whether the area is touched or not touched. The non-touched area may be located within and/or outside the target fingerprint zones Z1, Z2, Z3 and Z4. In other words, at least one non-touched area can be scanned with a higher speed than the touched area, and/or at least one fingerprint zone not covering the touched area can be scanned with a higher speed than the touched area.

Different accelerating method can also be performed, including scanning with a higher speed, or alternatively, not scanning (i.e., skipping scanning). In other words, at least one fingerprint zone not covering the touched area (and/or at least one non-touched area) can be scanned with a higher speed than the touched area, and/or at least one fingerprint zone not covering the touched area (and/or at least one non-touched area) cannot be scanned.

Therefore, numerous methods of accelerated scanning operation can be performed according to design requirement. For example, in the same or alternative embodiments, the accelerated scanning operation, can include: scanning the touched area to control the target fingerprint zones to perform fingerprint sensing; and accelerating scanning at least one non-touched area. The non-touched area may be located within and/or outside the target fingerprint zones Z1, Z2, Z3 and Z4.

The accelerated scanning operation, in the same or alternative embodiments, can include: scanning the target fingerprint zones (e.g., the fingerprint zones Z1, Z2, Z3 and Z4 illustrated in FIG. 2) to control the target fingerprint zones to perform fingerprint sensing; and skipping the fingerprint zones other than the target fingerprint zones Z1, Z2, Z3 and Z4 among the fingerprint zones.

In the same or alternative embodiments, the accelerated scanning operation, can include: scanning the touched area to control the target fingerprint zones to perform fingerprint sensing; and skipping scanning at least one non-touched area. The non-touched area may be located within and/or outside the target fingerprint zones Z1, Z2, Z3 and Z4.

After or when the accelerated scanning operation is performed, sensing signals (fingerprint sensing results) can be read out from the target fingerprint zones Z1, Z2, Z3 and Z4 by the reading circuit. In some embodiments, the reading operation can include reading all of the fingerprint zones without skipping reading any fingerprint zone. In alternative embodiments, the reading operation can also be accelerated. To be more specifically, the fingerprint sensing control circuit 120 can skip reading at least one (a part or all) of the fingerprint zones other than the target fingerprint zones (e.g., the fingerprint zones Z1, Z2, Z3 and Z4 illustrated in FIG. 2). This means that the fingerprint sensing control circuit 120 does not read any sensing signal from the fingerprint zones other than the target fingerprint zones Z1, Z2, Z3 and Z4.

In some implementations, the fingerprint zones are coupled to a plurality of scanning groups in a row direction of the display panel 150. Each of the scanning groups can include one or more scanning lines coupled to a plurality of fingerprint sensing units in the fingerprint zones. Based on a design requirement, in some embodiments, the operation of the accelerated scanning operation includes: setting a scanning speed corresponding to at least one target scanning group coupled to at least the touched area in the at least one target fingerprint zone to a first speed; and setting a scanning speed corresponding to one or more scanning groups other than the at least one target scanning group among the scanning groups to a second speed greater than the first speed. In some the same or alternative embodiments, the operation of the accelerated scanning operation includes: skipping scanning one or more scanning groups other than the at least one target scanning group among the scanning groups.

Figure 4:
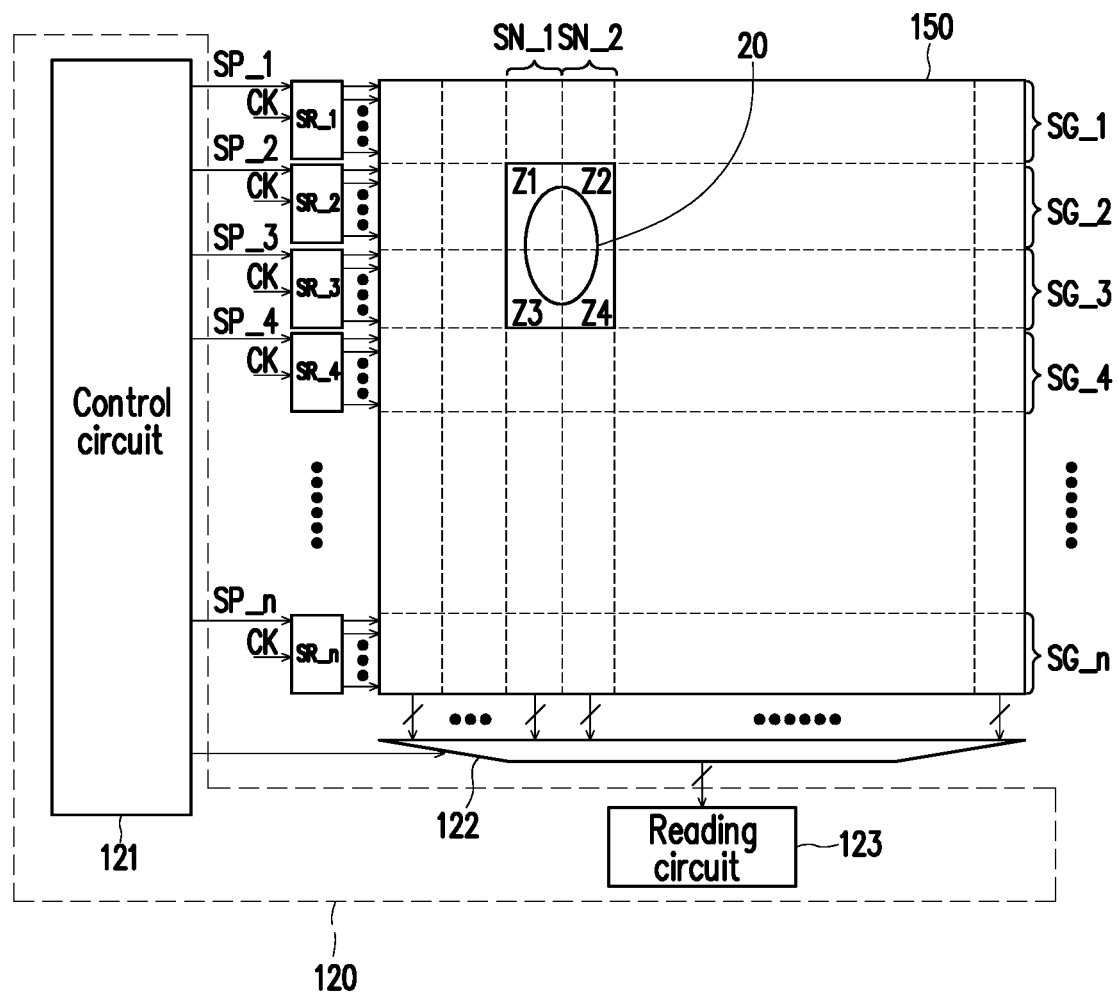
FIG. 4 is a schematic circuit block diagram illustrating the fingerprint sensing control circuit according to an embodiment of the invention.

FIG. 4 is a schematic circuit block diagram illustrating the fingerprint sensing control circuit 120 according to an embodiment of the invention. The display panel 150 illustrated in FIG. 4 may be inferred with reference to the description related to the display panel 150 and thus, will not be repeated. Referring to FIG. 1 and FIG. 4, the fingerprint sensing control circuit 120 includes a control circuit 121. The display panel 150 may further include one or more shift register groups, for example, shift register groups SR_1, SR_2, SR_3, SR_4, . . . and SR_n illustrated in FIG. 4, wherein n may be an integer determined based on a design requirement. Based on a design requirement, the shift register groups SR_1 to SR_n may be integrated gate driver on array (GOA) circuits and disposed on the display panel 150. In other embodiment, the shift register groups SR_1 to SR_n may be disposed in the fingerprint sensing control circuit 120. In more other embodiments, a part or all of the fingerprint sensing control circuit 120 and a part or all the GOA circuit can be integrated or separated according to different design requirements.

The fingerprint zones of the display panel 150 illustrated in FIG. 4 can be coupled to a plurality of scanning groups SG_1, SG_2, SG_3, SG_4, . . . and SG_n in a row direction. Each of the scanning groups SG_1 to SG_n can include one or more scanning lines. Each of the scanning groups SG_1 to SG_n can be coupled to a corresponding one of the shift register groups SR_1 to SR_n, as illustrated in FIG. 4. Each of the shift register groups SR_1 to SR_n can receive corresponding start pulse signals, for example, SP_1, SP_2, SP_3, SP_4, . . . and SP_n from the control circuit 121. The GOA circuit may generate or receive a clock signal CK which may trigger the shift register groups SR_1 to SR_n to control a plurality of sensing units of the display panel 150. Implementation details of the shift register groups SR_1 to SR_n are not limited in the present embodiment. Based on a design requirement, in some embodiments, any one of the shift register groups SR_1 to SR_n may be a conventional shifting register or other shifting register circuits.

Figure 5:
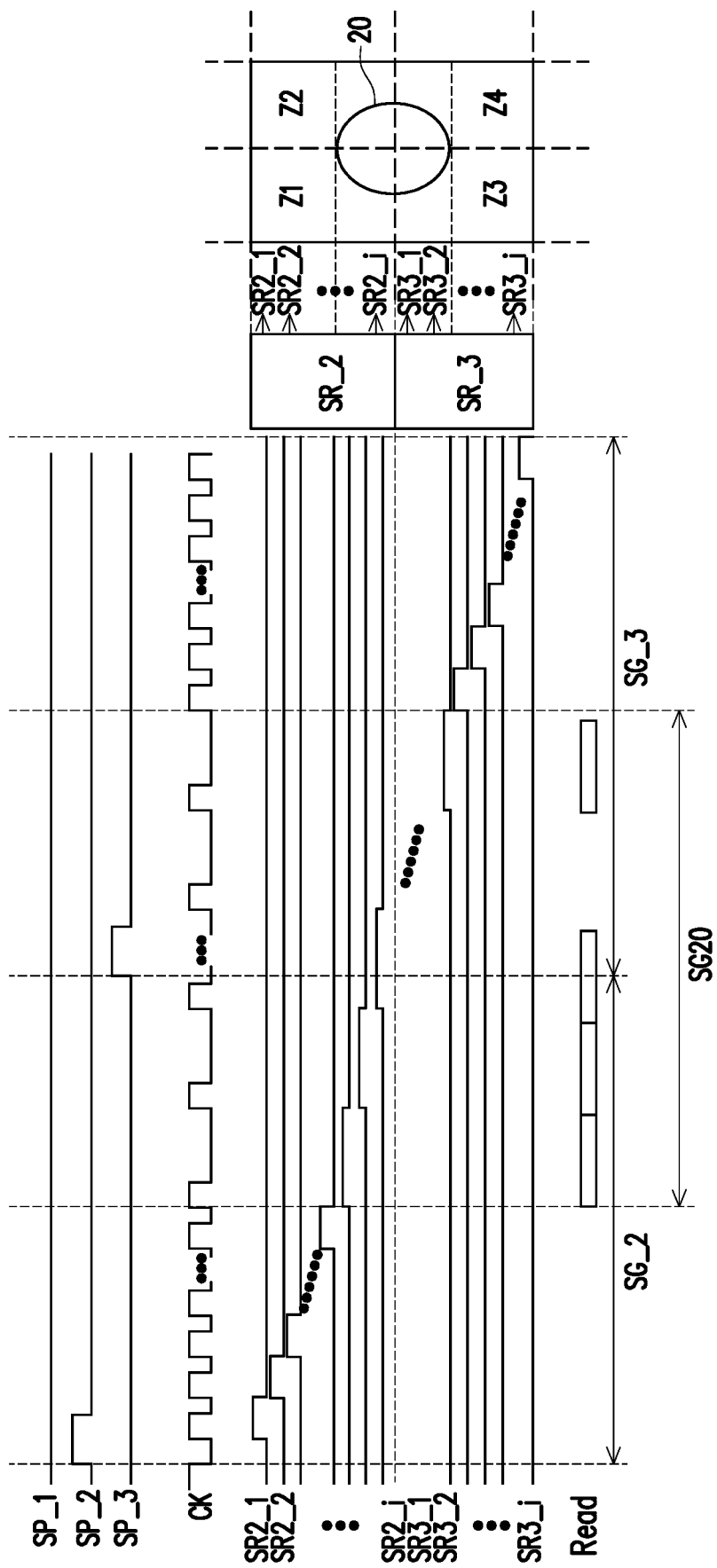
FIG. 5 is a schematic signal timing diagram of the fingerprint sensing control circuit according to an embodiment of the invention.

FIG. 5 is a schematic signal timing diagram of the fingerprint sensing control circuit 120 according to an embodiment of the invention. The embodiment of FIG. 5 can be applied to (but not limited thereto) the embodiment of FIG. 4. The touched area 20, the target fingerprint zones Z1 to Z4, the shift register group SR_2 and the shift register group SR_3 illustrated in FIG. 4 are particularly shown on the right side in FIG. 5. Referring to FIG. 4 and FIG. 5, according to the start pulse signal SP_2 and the clock signal CK, the shift register group SR_2 may output scanning signals SR2_1, SR2_2, . . . and SR2_$i$ to the scanning group SG_2, wherein i may be an integer determined based on a design requirement. According to the start pulse signal SP_3 and the clock signal CK, the shift register group SR_3 may output scanning signals SR3_1, SR3_2, . . . , SR3_$i$ to the scanning group SG_3.

In some embodiments, the control circuit 121 may obtain information (including the location and/or the area size) of the touched area 20 from the touch control circuit 130. In some other embodiments, the control circuit 121 may obtain the information of the touched area 20 from the AP 110. The control circuit 121 may obtain the information of the touched area 20 to perform an accelerated scanning operation. In the embodiment illustrated in FIG. 5, the operation of the "accelerated scanning operation" includes: by the control circuit 121, skipping the scanning of the other scanning groups SG_1 and SG_4 to SG_n that are not coupled to the target fingerprint zones Z1, Z2, Z3 and Z4. The operation of "skipping" includes not transmitting any scanning signal to the scanning groups SG_1 and SG_4 to SG_n. For example, according to the information of the touched area 20, the control circuit 121 applies a pulse to the start pulse signals SP_2 and SP_3 of the target shift register groups SR_2 and SR_3 and does not apply the pulse to the start pulse signals SP_1 and SP_4 to SP_n of the other shift register groups SR_1 and SR_4 to SR_n, as illustrated in FIG. 5. Namely, the start pulse is provided to trigger the target shift register groups SR_2 and SR_3 corresponding to the target scanning groups SG_2 and SG_3, and the start pulse is not provided, so as not to trigger the shift register groups SR_1 and SR_4 to SR_n corresponding to the scanning groups SG_1 and SG_4 to SG_n that are not coupled to the target fingerprint zones Z1, Z2, Z3 and Z4.

In the embodiment illustrated in FIG. 5, the control circuit 121 may set a scanning speed for a target scan period SG20 corresponding to the touched area 20 to a first speed and set a scanning speed for a scan period other than the target scanning period SG20 to a second speed (wherein the second speed is greater than the first speed). For example, the control circuit 121 may set the clock signal CK to have a first frequency in the target scanning period SG20 and set the clock signal CK to have a second frequency in the scan period other than the target scanning period SG20 (wherein the second frequency is higher than the first frequency).

In alternative embodiments, the operation of the "accelerated scanning operation" includes: setting the scanning speed corresponding to the target scanning groups SG_2 and SG_3 coupled to the target fingerprint zones Z1, Z2, Z3 and Z4 to the first speed and setting the scanning speed corresponding to the scanning groups other than the target scanning groups SG_2 and SG_3 among the scanning groups SG_1 to SG_n to the second speed (wherein the second speed is greater than the first speed). The operation of "setting the scanning speed corresponding to the target scanning groups SG_2 and SG_3 coupled to the target fingerprint zones Z1, Z2, Z3 and Z4 to the first speed" includes: setting the clock signal CK to have the first frequency, wherein the first frequency is applied to the shift register groups SR_2 and SR_3 corresponding to the target scanning groups SG_2 and SG_3. The operation of "setting the scanning speed corresponding to the scanning groups other than the target scanning groups SG_2 and SG_3 among the scanning groups SG_1 to SG_n to the second speed" includes: setting the clock signal CK to have the second frequency, wherein the second frequency is applied to the shift register groups corresponding to the scanning groups (e.g., SR_1 and SR_4 to SR_n) other than scanning groups SG_2 and SG_3 among the scanning groups SG_1 to SG_n.

shift register groups SR_1 and SR_4 to SR_n, as illustrated in FIG. 5. The embodiment differs from the embodiment shown in FIG. 5 in that the target shift register groups SR_2 and SR_3 scan the entire target scanning groups SG_2 and SG_3 without speeding up the clock. For example, the control circuit 121 may set the clock signal CK to have a first frequency in the target scanning period SG20 illustrated in FIG. 5 and set the clock signal CK to have the same first frequency in the scan period other than the target scanning period SG20 in the target scanning groups SG_2 and SG_3.

In still another embodiment, the operation of the "accelerated scanning operation" may include Operation C illustrated in Table 1. For example, referring FIG. 4, the control circuit 121 may scan the other scanning groups SG_1 and SG_4 to SG_n but speed up the clock for the shift register groups SR_1 and SR_4 to SR_n. For example, according to the information of the touched area 20, the control circuit 121 apply the pulse to the start pulse signals SP_1 and SP_4 to SP_n of the other shift register groups SR_1 and SR_4 to SR_n, and set the clock signal CK to have an accelerated frequency (the second frequency) for the other shift register groups SR_1 and SR_4 to SR_n. The target shift register groups SR_2 and SR_3 scan the entire target scanning groups SG_2 and SG_3 without speeding up the clock.

In still another embodiment, the operation of the "accelerated scanning operation" may include Operation D illustrated in Table 1. For example, referring FIG. 4, the control circuit 121 may scan the other scanning groups SG_1 and SG_4 to SG_n but speed up the clock for the shift register groups SR_1 and SR_4 to SR_n. The control circuit 121 may set a scanning speed for a target scan period SG20 illustrated in FIG. 5 corresponding to the touched area 20 to a first speed and set a scanning speed for a scan period other than the target scanning period SG20 to a second speed (wherein the second speed is greater than the first speed). For example, the control circuit 121 may set the clock signal CK to have a first frequency in the target scanning period SG20 and set the clock signal CK to have a second frequency in the scan period other than the target scanning period SG20 (wherein the second frequency is higher than the first frequency).

TABLE 1

Acceleration method for the scanning groups

| scanning groups | accelerated scanning operation | | | |
|---|---|---|---|---|
| | Operation A | Operation B | Operation C | Operation D |
| Not coupled to the target zone | Skip the scanning | Skip the scanning | Scanning but speed up the clock | Scanning but speed up the clock |
| Coupled to the target zone | Scan the entire scanning group without speeding up the clock | Do not speed up the clock in the touched area, and speed up the clock outside the touched area | Scan the entire scanning group without speeding up the clock | Do not speed up the clock in the touched area, and speed up the clock outside the touched area |

In the embodiment illustrated in FIG. 5, the operation of the "accelerated scanning operation" includes Operation B illustrated in Table 1. In another embodiment, the operation of the "accelerated scanning operation" may include Operation A illustrated in Table 1. For example, referring FIG. 4, the control circuit 121 may skip the scanning of the other scanning groups SG_1 and SG_4 to SG_n that are not coupled to the target fingerprint zones Z1, Z2, Z3 and Z4. For example, according to the information of the touched area 20, the control circuit 121 does not apply the pulse to the start pulse signals SP_1 and SP_4 to SP_n of the other In the embodiment illustrated in FIG. 4, the display panel 150 further includes a multiplexer circuit 122, and the fingerprint sensing control circuit 120 further includes a fingerprint reading circuit 123. In a column direction of the display panel 150, the fingerprint zones of the display panel 150 are coupled to a plurality of sensing groups, for example, sensing groups SN_1 and SN_2 illustrated in FIG. 4. Each of the sensing groups includes one or more sensing lines. The multiplexer circuit 122 is coupled to the sensing groups of the fingerprint zones of the display panel 150. The fingerprint reading circuit 123 is coupled to the multiplexer circuit 122. Based on a design requirement, the multiplexer circuit 122 may be disposed on the display panel 150. In other embodiment, the multiplexer circuit 122 may be disposed in the fingerprint sensing control circuit 120.

Figure 6:
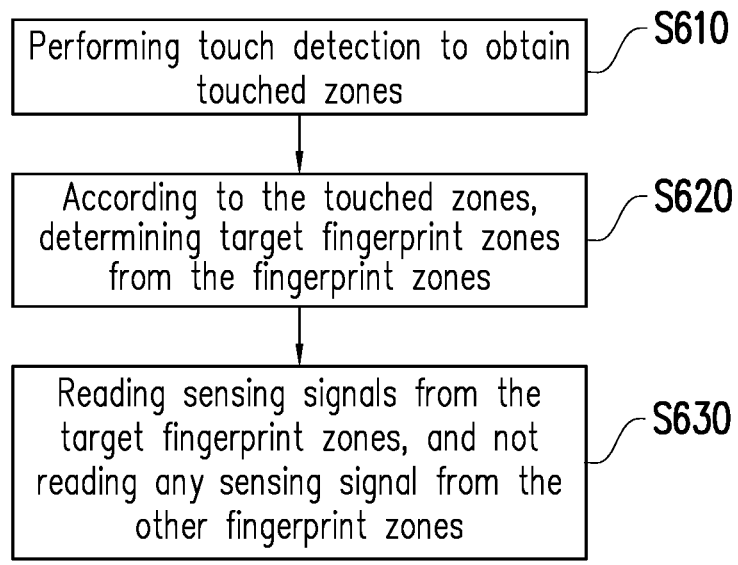
FIG. 6 is a flowchart illustrating a fingerprint sensing control method according to another embodiment of the invention.

FIG. 6 is a flowchart illustrating a fingerprint sensing control method according to another embodiment of the invention. Steps S610 and S620 illustrated in FIG. 6 may be inferred with reference to the descriptions related to steps S310 and 320 illustrated in FIG. 3 and thus, will not be repeated. The fingerprint sensing control circuit 120 may include a control circuit for scanning operation and a reading circuit for reading operation. Referring to FIG. 1, FIG. 2 and FIG. 6, the fingerprint sensing control circuit 120, in step S630, scans the target fingerprint zones Z1, Z2, Z3 and Z4 to control the target fingerprint zones Z1, Z2, Z3 and Z4 to perform the fingerprint sensing. The fingerprint sensing control circuit 120, in step S630, performs an "accelerated reading operation" by the reading circuit. The "accelerated reading operation" includes: reading sensing signals (fingerprint sensing results) from the target fingerprint zones Z1, Z2, Z3 and Z4 and skipping reading fingerprint zones other than the target fingerprint zones Z1, Z2, Z3 and Z4 among the fingerprint zones of the display panel 150. The "skipping reading" includes: not reading any sensing signal from the other fingerprint zones that are skipped. For example, the control circuit 121 may control the multiplexer circuit 122 to turn on a plurality of signal paths from the target sensing groups SN_1 and SN_2 coupled to the target fingerprint zones Z1, Z2, Z3 and Z4 to the fingerprint reading circuit 123 and turn off a plurality of signal paths from the sensing groups other than the target sensing groups SN_1 and SN_2 among the sensing groups to the fingerprint reading circuit 123.

It is noted that in different implementations, only one of the embodiment of FIG. 3 and the embodiment of FIG. 6 can be performed. That is, only one of scanning or reading operation is accelerated. Alternatively, the embodiment of FIG. 3 and the embodiment of FIG. 6 can be performed in combination. That is, both the scanning operation and reading operation can be accelerated.

Based on the above, the sensing region of the display panel 150 of the present embodiment is divided into a plurality of fingerprint zones. When an object (e.g., one or more fingers) touches the display panel, the touch control circuit 130 can perform the touch detection on the display panel to obtain the touched area 20. The fingerprint sensing control circuit can determine one or more target fingerprint zones (e.g., Z1, Z2, Z3 and Z4) from the fingerprint zones of the display panel according to the touched area 20. The touched area can be located in the one or more target fingerprint zones. The fingerprint sensing control circuit 120 can scan the target fingerprint zones Z1, Z2, Z3 and Z4 and read the sensing signals from the target fingerprint zones Z1, Z2, Z3 and Z4, so as to perform the fingerprint sensing. For the fingerprint zones other than the target fingerprint zones Z1, Z2, Z3 and Z4 among the fingerprint zones of the display panel, the fingerprint sensing control circuit 120 can skip reading the other fingerprint zones, so as to accelerate the fingerprint reading operation of the sensing region of the display panel. In a condition that the other fingerprint zones have no fingerprint (i.e., not covered by the finger), since transmission for invalid data is reduced, a transmission frequency bandwidth between the AP 110 and the fingerprint sensing control circuit 120 can be effectively used. Furthermore, in some embodiments, the AP 110 can activate the fingerprint sensing control circuit 120 only after the touch detection result of the touch control circuit 130 matches a predetermined gesture. Thus, the power consumption of the fingerprint sensing control circuit 120 can be effectively reduced.

Figure 7:
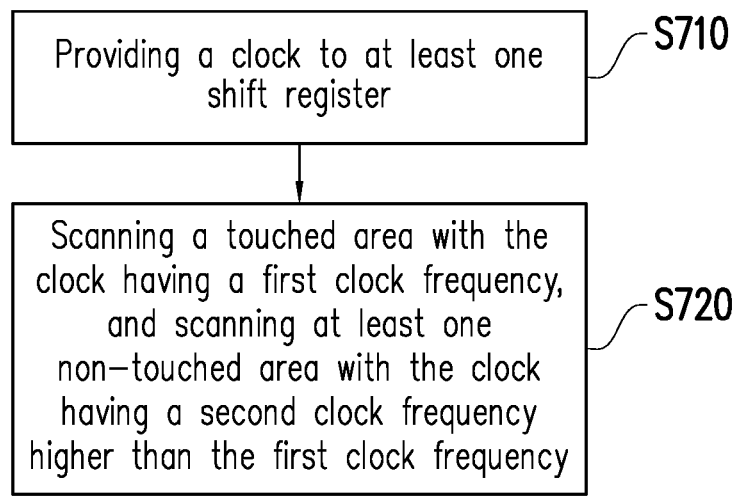
FIG. 7 is a flowchart illustrating a fingerprint sensing control method according to another embodiment of the invention.

FIG. 7 is a flowchart illustrating a fingerprint sensing control method according to another embodiment of the invention. Referring to FIG. 1, FIG. 2, FIG. 4 and FIG. 7, in step S710, the fingerprint sensing control circuit 120 provides the clock signal CK to at least one of the shift register groups SR_1 to SR_n for performing scanning operation on the fingerprint zones. In step S720, the fingerprint sensing control circuit 120 scan a touched area 20 with the clock signal CK having a first clock frequency, and scan at least one first non-touched area 20 with the clock signal CK having a second clock frequency higher than the first clock frequency.

In some embodiments, the touched area 20 are located in at least one target fingerprint zone (e.g. the target fingerprint zones Z1 to Z4) among the fingerprint zones, and the at least one first non-touched area further comprise the rest area within the at least one target fingerprint zone.

In some embodiments, the at least one first non-touched area scanned with the clock signal CK having the second clock frequency further comprises at least one fingerprint zone other than the at least one target fingerprint zone (e.g. the target fingerprint zones Z1 to Z4).

In some embodiments, the fingerprint sensing control method further comprises skipping scanning at least one fingerprint zone other than the at least one target fingerprint zone.

It is noted that the clock signal CK in the embodiment can mean one or more clock signals. More specifically, the clock signal can be implemented as the same clock signal having an adjustable clock frequency, or alternatively, the clock signal can mean different clock signal having different clock frequencies.

Based on different design demands, the blocks of the AP 110, the fingerprint sensing control circuit 120 and (or) the touch control circuit 130 may be implemented in a form of hardware, firmware, software (i.e., programs) or in a combination of many of the aforementioned three forms.

In terms of the hardware form, the blocks of the AP 110, the fingerprint sensing control circuit 120 and (or) the touch control circuit 130 may be implemented in a logic circuit on the integrated circuit. Related functions of the AP 110, the fingerprint sensing control circuit 120 and (or) the touch control circuit 130 may be implemented in a form of hardware by utilizing hardware description languages (e.g., Verilog HDL or VHDL) or other suitable programming languages. For example, the related functions of the AP 110, the fingerprint sensing control circuit 120 and (or) the touch control circuit 130 may be implemented in one or more controllers, micro-controllers, microprocessors, application-specific integrated circuits (ASICs), digital signal processors (DSPs), field programmable gate arrays (FPGAs) and/or various logic blocks, modules and circuits in other processing units.

In terms of the software form and/or the firmware form, the related functions of the AP 110, the fingerprint sensing control circuit 120 and (or) the touch control circuit 130 may be implemented as programming codes. For example, the AP 110, the fingerprint sensing control circuit 120 and (or) the touch control circuit 130 may be implemented by using general programming languages (e.g., C or C++) or other suitable programming languages. The programming codes may be recorded/stored in recording media, and the aforementioned recording media include, for example, a read only memory (ROM), a storage device and/or a random access memory (RAM). The programming codes may be accessed from the recording medium and executed by a computer, a central processing unit (CPU), a controller, a micro-controller or a microprocessor to accomplish the related functions. As for the recording medium, a "non-transitory computer readable medium", such as a tape, a disk, a card, a semiconductor memory or a programming logic circuit, may be used. In addition, the programs may be provided to the computer (or the CPU) through any transmission medium (e.g., a communication network or radio waves). The communication network is, for example, the Internet, wired communication, wireless communication or other communication media.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A fingerprint sensing control method, for performing a fingerprint sensing control on a display panel, wherein the display panel comprises a sensing region divided into a plurality of fingerprint zones, the fingerprint sensing control method comprising:
   determining at least one target fingerprint zone from the fingerprint zones according to at least one touched area;
   scanning the at least one target fingerprint zone to control the at least one target fingerprint zone to perform fingerprint sensing;
   performing an accelerated reading operation, wherein the accelerated reading operation comprises:
      reading at least one sensing signal from the at least one target fingerprint zone; and
      skipping reading at least one of the fingerprint zones other than the at least one target fingerprint zone among the fingerprint zones, wherein the skipping reading comprises:
         not reading any sensing signal from the at least one fingerprint zone that is skipped; and
   performing an accelerated scanning operation, wherein the fingerprint zones are coupled to a plurality of scanning groups in a row direction of the display panel, each of the scanning groups comprises one or more scanning lines, and the operation of performing the accelerated scanning operation comprises:
      setting a scanning speed corresponding to at least one target scanning group coupled to at least the touched area in the at least one target fingerprint zone to a first speed; and
      setting a scanning speed corresponding to one or more scanning groups other than the at least one target scanning group among the scanning groups to a second speed, wherein the second speed is higher than the first speed,
      wherein the one or more scanning groups other than the at least one target scanning group cross only a non-touched area in the at least one target fingerprint zone.

2. The fingerprint sensing control method according to claim 1, wherein the target scanning group crosses only the touched area in the at least one target fingerprint zone and does not cross to the non-touched area in the at least one target fingerprint zone.

3. The fingerprint sensing control method according to claim 2, wherein the one or more scanning groups other than the at least one target scanning group cross the fingerprint zones other than the at least one target fingerprint zone among the fingerprint zones.

4. The fingerprint sensing control method according to claim 1, wherein the operation of performing the accelerated scanning operation further comprises:
   skipping scanning of at least one scanning group not coupled to the at least one target fingerprint zone, wherein the skipping operation comprises not transmitting any scanning signal to the at least one scanning group.

5. The fingerprint sensing control method according to claim 4, wherein each of the scanning groups is coupled to a corresponding one of a plurality of shift register groups,
   the operation of scanning the at least one target fingerprint zone comprises:
      providing at least one start pulse to trigger at least one target shift register group corresponding to at least one target scanning group, wherein the at least one target scanning group is coupled to the at least one target fingerprint zone, and
   the operation of skipping scanning for the at least one scanning group not coupled to the at least one target fingerprint zone comprises:
      not providing the start pulse, so as not to trigger the shift register groups corresponding to the at least one scanning group not coupled to the at least one target fingerprint zone.

6. The fingerprint sensing control method according to claim 1, wherein the display panel comprises a fingerprint sensor, and the fingerprint sensor is arranged in one of an on-display configuration, an under-display configuration, a local in-display configuration and a global in-display configuration.

7. The fingerprint sensing control method according to claim 6, wherein the fingerprint sensor is an optical fingerprint sensor.

8. The fingerprint sensing control method according to claim 1, wherein the target scanning group cross an entire area of the at least one target fingerprint zone.

9. The fingerprint sensing control method according to claim 1, wherein the one or more scanning groups other than the at least one target scanning group do not cross the non-touched area in the at least one target fingerprint zone and cross the fingerprint zones other than the at least one target fingerprint zone among the fingerprint zones.

10. The fingerprint sensing control method according to claim 1, wherein each of the scanning groups is coupled to a corresponding one of a plurality of shift register groups,
    the operation of setting the scanning speed corresponding to the at least one target scanning group coupled to the at least one target fingerprint zone to the first speed comprises:
       setting a clock signal to have a first frequency and applying the first frequency to at least one target shift register group corresponding to the at least one target scanning group, and
    the operation of setting the scanning speed corresponding to the scanning groups other than the at least one target scanning group among the scanning groups to the second speed comprises:
       setting the clock signal to have a second frequency and applying the second frequency to the shift register groups corresponding to the scanning groups other than the at least one target scanning group among the scanning groups, wherein the second frequency is higher than the first frequency.

11. The fingerprint sensing control method according to claim 1, wherein the fingerprint zones are coupled to a plurality of sensing groups in a column direction of the display panel, each of the sensing groups comprises one or more sensing lines, the operation of reading the at least one sensing signal from the at least one target fingerprint zone comprises:
turning on, by a multiplexer circuit, a plurality of signal paths from at least one target sensing group coupled to the at least one target fingerprint zone to a fingerprint reading circuit, and
the operation of skipping reading the at least one fingerprint zone other than the at least one target fingerprint zone among the fingerprint zones comprises:
turning off, by the multiplexer circuit, a plurality of signal paths from the sensing groups other than the at least one target sensing group among the sensing groups to the fingerprint reading circuit.

12. The fingerprint sensing control method according to claim 1, wherein the operation of determining the at least one target fingerprint zone from the fingerprint zones according to the at least one touched area comprises:
determining at least one location of the at least one target fingerprint zone according to at least one location of the at least one touched area.

13. The fingerprint sensing control method according to claim 1, wherein the operation of determining the at least one target fingerprint zone from the fingerprint zones according to the at least one touched area comprises:
determining a total number of the at least one target fingerprint zone according to at least one area of the at least one touched area.

14. An electronic device capable of controlling a fingerprint sensing control on a display panel, wherein the display panel comprises a sensing region divided into a plurality of fingerprint zones, the electronic device comprising:
a touch control circuit, coupled to the display panel, and configured to perform touch detection on the display panel to obtain at least one touched area corresponding to at least one finger; and
a fingerprint sensing control circuit, coupled to the touch control circuit to obtain information of the at least one touched area, and coupled to the display panel to perform the fingerprint sensing control on the display panel, wherein the fingerprint sensing control circuit is configured to determine at least one target fingerprint zone from the fingerprint zones according to the at least one touched area, scan the at least one target fingerprint zone to control the at least one target fingerprint zone to perform fingerprint sensing, perform an accelerated reading operation, and perform an accelerated scanning operation,
wherein the accelerated reading operation comprises:
reading at least one sensing signal from the at least one target fingerprint zone; and
skipping reading at least one of the fingerprint zones other than the at least one target fingerprint zone among the fingerprint zones, so as not to read any sensing signal from the at least one fingerprint zone that is skipped,
wherein the fingerprint zones are coupled to a plurality of scanning groups in a row direction of the display panel, each of the scanning groups comprises one or more scanning lines, and the accelerated scanning operation comprises:
setting a scanning speed corresponding to at least one target scanning group coupled to at least the touched area in the at least one target fingerprint zone to a first speed; and
setting a scanning speed corresponding to one or more scanning groups other than the at least one target scanning group among the scanning groups to a second speed that is higher than the first speed,
wherein the one or more scanning groups other than the at least one target scanning group cross only a non-touched area in the at least one target fingerprint zone.

15. The electronic device according to claim 14, wherein the target scanning group crosses only the touched area in the at least one target fingerprint one and does not cross to the non-touched area in the at least one target fingerprint zone.

16. The electronic device according to claim 15, wherein the one or more scanning groups other than the at least one target scanning group cross the fingerprint zones other than the at least one target fingerprint zone among the fingerprint zones.

17. The electronic device according to claim 14, wherein the accelerated scanning operation further comprises:
skipping scanning of at least one scanning group not coupled to the at least one target fingerprint zone, wherein the skipping operation comprises not transmitting any scanning signal to the at least one scanning group.

18. The electronic device according to claim 17, wherein each of the scanning groups is coupled to a corresponding one of a plurality of shift register groups, and the fingerprint sensing control circuit is configured to:
provide at least one start pulse to trigger at least one target shift register group corresponding to at least one target scanning group, wherein the at least one target scanning group is coupled to the at least one target fingerprint zone; and
not provide a start pulse, so as not to trigger the shift register groups corresponding to the at least one scanning group not coupled to the at least one target fingerprint zone.

19. The electronic device according to claim 14, wherein the display panel comprises a fingerprint sensor, and the fingerprint sensor is arranged in one of an on-display configuration, an under-display configuration, a local in-display configuration and a global in-display configuration.

20. The electronic device according to claim 19, wherein the fingerprint sensor is an optical fingerprint sensor.

21. The electronic device according to claim 14, wherein the target scanning group cross an entire area of the at least one target fingerprint zone.

22. The electronic device according to claim 14, wherein the one or more scanning groups other than the at least one target scanning group do not cross the non-touched area in the at least one target fingerprint zone and cross the fingerprint zones other than the at least one target fingerprint zone among the fingerprint zones.

23. The electronic device according to claim 14, wherein each of the scanning groups is coupled to a corresponding one of a plurality of shift register groups, and the fingerprint sensing control circuit is configured to set a clock signal to have a first frequency for at least one target shift register group corresponding to the at least one target scanning group and configured to set the clock signal to have a second frequency for the shift register groups corresponding to the scanning groups other than the at least one target scanning group among the scanning groups, wherein the second frequency is higher than the first frequency.

24. The electronic device according to claim 14, wherein the fingerprint zones are coupled to a plurality of sensing groups in a column direction of the display panel through a multiplexer circuit, and each of the sensing groups comprises one or more sensing lines, wherein the fingerprint sensing control circuit comprises:
a fingerprint reading circuit, coupled to the multiplexer circuit,
wherein the fingerprint sensing control circuit is configured to control the multiplexer circuit to turn on a plurality of signal paths from at least one target sensing group coupled to the at least one target fingerprint zone to the fingerprint reading circuit, and configured to control the multiplexer circuit to turn off a plurality of signal paths from the sensing groups other than the at least one target sensing group among the sensing groups to the fingerprint reading circuit.

25. The electronic device according to claim 14, wherein the fingerprint sensing control circuit is configured to determine at least one location of the at least one target fingerprint zone according to at least one location of the at least one touched area.

26. The electronic device according to claim 14, wherein the fingerprint sensing control circuit is configured to determine a total number of the at least one target fingerprint zone according to at least one area of the at least one touched area.

27. A fingerprint sensing control method, for performing a fingerprint sensing control on a display panel, wherein the display panel comprises a sensing region divided into a plurality of fingerprint zones, the fingerprint sensing control method comprising:
determining at least one target fingerprint zone from the fingerprint zones according to at least one touched area; and
performing an accelerated scanning operation, wherein the accelerated scanning operation comprises:
scanning the at least one target fingerprint zone to control the at least one target fingerprint zone to perform fingerprint sensing;
accelerating scanning or skipping at least one fingerprint zone other than the at least one target fingerprint zone among the fingerprint zones; and
reading at least one sensing signal from the at least one target fingerprint zone,
wherein the fingerprint zones are coupled to a plurality of scanning groups in a row direction of the display panel, each of the scanning groups comprises one or more scanning lines, and the operation of performing the accelerated scanning operation further comprises:
setting a scanning speed corresponding to at least one target scanning group coupled to at least the touched area in the at least one target fingerprint zone to a first speed; and
setting a scanning speed corresponding to one or more scanning groups other than the at least one target scanning group among the scanning groups to a second speed, wherein the second speed is higher than the first speed,
wherein the one or more scanning groups other than the at least one target scanning group cross only a non-touched area in the at least one target fingerprint zone.

28. The fingerprint sensing control method according to claim 27, wherein the target scanning group crosses only the touched area in the at least one target fingerprint zone and does not cross to the non-touched area in the at least one target fingerprint zone.

29. The fingerprint sensing control method according to claim 28, wherein the one or more scanning groups other than the at least one target scanning group cross the fingerprint zones other than the at least one target fingerprint zone among the fingerprint zones.

30. The fingerprint sensing control method according to claim 27, wherein the operation of performing the accelerated scanning operation further comprises:
skipping scanning of at least one scanning group not coupled to the at least one target fingerprint zone, wherein the operation of skipping comprises not transmitting any scanning signal to the scanning groups.

31. The fingerprint sensing control method according to claim 30, wherein each of the scanning groups is coupled to a corresponding one of a plurality of shift register groups, and the operation of scanning the at least one target fingerprint zone comprises:
provide at least one start pulse to trigger at least one target shift register group corresponding to at least one target scanning group, wherein the at least one target scanning group is coupled to the at least one target fingerprint zone, and
the operation of skipping scanning for the at least one scanning group not coupled to the at least one target fingerprint zone comprises:
not providing a start pulse, so as not to trigger the shift register groups corresponding to the at least one scanning group not coupled to the at least one target fingerprint zone.

32. The fingerprint sensing control method according to claim 27, wherein the display panel comprises a fingerprint sensor, and the fingerprint sensor is arranged in one of an on-display configuration, an under-display configuration, a local in-display configuration and a global in-display configuration.

33. The fingerprint sensing control method according to claim 32, wherein the fingerprint sensor is an optical fingerprint sensor.

34. The fingerprint sensing control method according to claim 27, further comprising performing an accelerated reading operation, wherein the accelerated reading operation comprises:
skipping reading at least one of the fingerprint zones other than the at least one target fingerprint zone among the fingerprint zones, wherein the skipping reading comprises:
not reading any sensing signal from the at least one fingerprint zone that is skipped.

35. The fingerprint sensing control method according to claim 27, wherein the target scanning group cross an entire area of the at least one target fingerprint zone.

36. The fingerprint sensing control method according to claim 27, wherein the one or more scanning groups other than the at least one target scanning group do not cross the non-touched area in the at least one target fingerprint zone and cross the fingerprint zones other than the at least one target fingerprint zone among the fingerprint zones.

37. The fingerprint sensing control method according to claim 27, wherein each of the scanning groups is coupled to a corresponding one of a plurality of shift register groups,
the operation of setting the scanning speed corresponding to the at least one target scanning group coupled to the at least one target fingerprint zone to the first speed comprises:

setting a clock signal to have a first frequency and applying the first frequency to at least one target shift register group corresponding to the at least one target scanning group; and the operation of setting the scanning speed corresponding to the scanning groups other than the at least one target scanning group among the scanning groups to the second speed comprises:

setting the clock signal to have a second frequency and applying the second frequency to the shift register groups corresponding to the scanning groups other than the at least one target scanning group among the scanning groups, wherein the second frequency is higher than the first frequency.

38. The fingerprint sensing control method according to claim 27, wherein the operation of determining the at least one target fingerprint zone from the fingerprint zones according to the at least one touched area comprises:

determining at least one location of the at least one target fingerprint zone according to at least one location of the at least one touched area.

39. The fingerprint sensing control method according to claim 27, wherein the operation of determining the at least one target fingerprint zone from the fingerprint zones according to the at least one touched area comprises:

determining a total number of the at least one target fingerprint zone according to at least one area of the at least one touched area.

40. An electronic device, comprising:

a touch control circuit, configured to be coupled to a display panel, and configured to perform touch detection on the display panel to obtain at least one touched area; and a fingerprint sensing control circuit, coupled to the touch control circuit to obtain the at least one touched area, and configured to be coupled to the display panel to perform a fingerprint sensing control on the display panel, wherein the display panel is divided into a plurality of fingerprint zones, the fingerprint sensing control circuit determines at least one target fingerprint zone from the fingerprint zones according to the at least one touched area, scans the at least one target fingerprint zone to control the at least one target fingerprint zone to perform fingerprint sensing, reads at least one sensing signal from the at least one target fingerprint zone, and skips reading at least one of the fingerprint zones other than the at least one target fingerprint zone among the fingerprint zones, so as not to read any sensing signal from the at least one fingerprint zone that is skipped, wherein the fingerprint sensing control circuit is configured to set a scanning speed corresponding to at least one target scanning group coupled to at least the touched area in the at least one target fingerprint zone to a first speed and configured to set a scanning speed corresponding to one or more scanning groups other than the at least one target scanning group among the scanning groups to a second speed that is higher than the first speed, wherein the one or more scanning groups other than the at least one target scanning group cross only a non-touched area in the at least one target fingerprint zone.

41. The electronic device according to claim 40, wherein the target scanning group crosses only the touched area in the at least one target fingerprint zone and does not cross to the non-touched area in the at least one target fingerprint zone.

42. The electronic device according to claim 41, wherein the one or more scanning groups other than the at least one target scanning group cross the fingerprint zones other than the at least one target fingerprint zone among the fingerprint zones.

43. The electronic device according to claim 40, wherein the target scanning group cross an entire area of the at least one target fingerprint zone.

44. The electronic device according to claim 40, wherein the one or more scanning groups other than the at least one target scanning group do not cross the non-touched area in the at least one target fingerprint zone and cross the fingerprint zones other than the at least one target fingerprint zone among the fingerprint zones.

45. The electronic device according to claim 40, wherein the display panel comprises:

a plurality of shift register groups, wherein the fingerprint zones are coupled to a plurality of scanning groups in a row direction of the display panel, each of the scanning groups comprises one or more scanning lines, wherein each of the scanning groups is coupled to a corresponding one of the plurality of shift register groups, wherein the fingerprint sensing control circuit provides at least one start pulse to at least one target shift register group corresponding to the at least one target fingerprint zone among the shift register groups, and the fingerprint sensing control circuit does not provide the start pulse to the shift register groups other than the at least one target shift register group among the shift register groups.

46. The electronic device according to claim 40, wherein the fingerprint zones are coupled to a plurality of sensing groups in a column direction of the display panel, each of the sensing groups comprises one or more sensing lines, and the fingerprint sensing control circuit comprises:

a multiplexer circuit, coupled to the sensing groups of the fingerprint zones; and a fingerprint reading circuit, coupled to the multiplexer circuit, wherein the multiplexer circuit turns on a plurality of signal paths from at least one target sensing group coupled to the at least one target fingerprint zone to the fingerprint reading circuit; and the multiplexer circuit turned off a plurality of signal paths from the sensing groups other than the at least one target sensing group among the sensing groups to the fingerprint reading circuit.

47. A fingerprint scanning control method, for performing a fingerprint sensing control on a display panel, wherein the display panel comprises a sensing region divided into a plurality of fingerprint zones, the fingerprint sensing control method comprising:

providing a clock to at least one shift register for performing scanning operation on the fingerprint zones;

scanning a touched area with the clock having a first clock frequency; and scanning at least one first non-touched area with the clock having a second clock frequency higher than the first clock frequency or skipping scanning the at least one first non-touched area, wherein the touched area is located in at least one target fingerprint zone among the fingerprint zones, and the at least one first non-touched area further comprise the rest area within the at least one target fingerprint zone, wherein the at least one first non-touched area within the at least one target fingerprint zone and at least one fingerprint zone other than the at least one target fingerprint zone are both served as the at least one first non-touched area and scanned with the clock having the second clock frequency.

48. The fingerprint scanning control method of claim 47, wherein the method further comprises skipping scanning at least one second non-touched area, wherein the at least one second non-touched area comprises at least one fingerprint zone other than the at least one target fingerprint zone.

49. The fingerprint scanning control method of claim 47, wherein a whole area of at least one target fingerprint zone is scanned with the clock having the first clock frequency.

50. The fingerprint scanning control method of claim 47, wherein a whole area of at least one target fingerprint zone is scanned with the clock having the first clock frequency, and at least one fingerprint zone other than the at least one target fingerprint zone is skipped for scanning.

* * * * *